(12) United States Patent  
Rembisz et al.

(10) Patent No.: US 11,607,804 B2  
(45) Date of Patent: Mar. 21, 2023

(54) ROBOT CONFIGURATION WITH THREE-DIMENSIONAL LIDAR

(71) Applicant: X Development LLC, Mountain View, CA (US)

(72) Inventors: Justine Rembisz, San Carlos, CA (US); John Tran, Mountain View, CA (US); Vincent Nabat, San Francisco, CA (US); Elmar Mair, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 767 days.

(21) Appl. No.: 16/528,141

(22) Filed: Jul. 31, 2019

(65) Prior Publication Data

US 2020/0376689 A1  Dec. 3, 2020

Related U.S. Application Data

(60) Provisional application No. 62/853,534, filed on May 28, 2019.

(51) Int. Cl.
    *G01S 17/931*    (2020.01)
    *B25J 9/16*    (2006.01)
    (Continued)

(52) U.S. Cl.
    CPC ............... *B25J 9/162* (2013.01); *B25J 5/007* (2013.01); *B25J 9/0096* (2013.01); *B25J 9/046* (2013.01);
(Continued)

(58) Field of Classification Search
CPC .. B25J 9/162; B25J 5/007; B25J 9/1697; B25J 13/089; B25J 19/022; B25J 19/027; B25J 9/06; G01S 7/4813; G01S 7/4865; G01S 17/931; G01S 17/88; G05B 2219/40298
(Continued)

(56) References Cited

U.S. PATENT DOCUMENTS 9,463,574 B2 * 10/2016 Purkayastha ........ G05D 1/0088
9,625,582 B2    4/2017 Gruver et al.
(Continued)

FOREIGN PATENT DOCUMENTS

CN    207415334 U    5/2018
CN    108908287 A    11/2018
(Continued)

OTHER PUBLICATIONS

Knightscope Inc (Knightscope) from Wikipedia, https://en.wikipedia.org/wiki/Knightscope, accessed on Jul. 31, 2019, last edited on Jul. 11, 2019, 5 pages.

*Primary Examiner* — Isiaka O Akanbi
(74) *Attorney, Agent, or Firm* — McDonnell Boehnen Hulbert & Berghoff LLP

(57) ABSTRACT

A mobile robotic device includes a mobile base and a mast fixed relative to the mobile base. The mast includes a carved-out portion. The mobile robotic device further includes a three-dimensional (3D) lidar sensor mounted in the carved-out portion of the mast and fixed relative to the mast such that a vertical field of view of the 3D lidar sensor is angled downward toward an arc in front of the mobile robotic device.

20 Claims, 11 Drawing Sheets

(51) Int. Cl.
*B25J 5/00* (2006.01)
*B25J 9/00* (2006.01)
*B25J 17/00* (2006.01)
*B25J 17/02* (2006.01)
*B25J 13/08* (2006.01)
*B25J 19/02* (2006.01)
*G01S 7/481* (2006.01)
*G01S 7/4865* (2020.01)
*B25J 9/04* (2006.01)

(52) U.S. Cl.
CPC ............ *B25J 9/1697* (2013.01); *B25J 13/089* (2013.01); *B25J 17/00* (2013.01); *B25J 17/02* (2013.01); *B25J 19/022* (2013.01); *B25J 19/027* (2013.01); *G01S 7/4813* (2013.01); *G01S 7/4865* (2013.01); *G01S 17/931* (2020.01); *G05B 2219/40298* (2013.01)

(58) Field of Classification Search
USPC ......... 356/3, 3.03, 437, 445–448, 4.01, 5.06
See application file for complete search history.

(56) References Cited

U.S. PATENT DOCUMENTS

| | | | |
|---|---|---|---|
| 9,651,658 | B2 | 5/2017 | Pennecot et al. |
| 10,011,016 | B1* | 7/2018 | Rembisz .................. B25J 5/007 |
| 10,302,749 | B2 | 5/2019 | Droz et al. |
| 2013/0083964 | A1* | 4/2013 | Morris .................. G01S 7/4808 382/103 |
| 2013/0226344 | A1 | 8/2013 | Wong et al. |
| 2015/0120057 | A1 | 4/2015 | Wong et al. |
| 2016/0341041 | A1* | 11/2016 | Puura ........................ E21B 3/00 |
| 2017/0285643 | A1* | 10/2017 | Ichinose .................. G05D 1/024 |
| 2019/0199946 | A1 | 6/2019 | Wendel et al. |

FOREIGN PATENT DOCUMENTS

| | | |
|---|---|---|
| JP | 2015092348 | 5/2015 |
| JP | 2015518188 | 6/2015 |
| JP | 2017033450 | 2/2017 |
| WO | 2012/091897 | 7/2012 |
| WO | WO-2020171714 A1 * | 8/2020 |

* cited by examiner

ROBOT CONFIGURATION WITH THREE-DIMENSIONAL LIDAR

CROSS REFERENCE TO RELATED APPLICATION

The present application claims priority to U.S. Provisional Patent Application No. 62/853,534 filed on May 28, 2019, the entire contents of which are incorporated herein by reference, as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

An example mobile robotic device includes a three-dimensional (3D) lidar sensor mounted to a fixed mast of the robot. The position and orientation of the 3D lidar sensor and resulting field of view may be optimized so that sensor data from the 3D lidar sensor may be used for front cliff detection, obstacle detection, and robot localization.

In an embodiment, a mobile robotic device is provided. The mobile robotic device includes a mobile base. The mobile robotic device further includes a mast fixed relative to the mobile base, where the mast includes a carved-out portion. The mobile robotic device additionally includes a 3D lidar sensor mounted in the carved-out portion of the mast and fixed relative to the mast such that a vertical field of view of the 3D lidar sensor is angled downward toward an area in front of the mobile robotic device.

In another embodiment, a method is provided. The method includes receiving sensor data indicative of an environment of a mobile robotic device from a three-dimensional 3D lidar sensor, where the 3D lidar sensor is mounted in a carved-out portion of a mast of the mobile robotic device and fixed relative to the mast such that a vertical field of view of the 3D lidar sensor is angled downward toward an area in front of the mobile robotic device. The method further includes controlling the mobile robotic device based on the sensor data.

In an additional embodiment, a mast for a mobile robotic device is provided. The mast includes a carved-out portion. The mast further includes a 3D lidar sensor mounted in the carved-out portion of the mast and fixed relative to the mast such that a vertical field of view of the 3D lidar sensor is angled downward in a direction extending outward from the carved-out portion of the mast.

In a further embodiment, a non-transitory computer readable medium is provided which includes programming instructions executable by at least one processor to cause the at least one processor to perform functions. The functions include receiving sensor data indicative of an environment of a mobile robotic device from a three-dimensional 3D lidar sensor, where the 3D lidar sensor is mounted in a carved-out portion of a mast of the mobile robotic device and fixed relative to the mast such that a vertical field of view of the 3D lidar sensor is angled downward toward an area in front of the mobile robotic device. The functions further include controlling the mobile robotic device based on the sensor data.

In another embodiment, a system is provided that includes means for receiving sensor data indicative of an environment of a mobile robotic device from a three-dimensional 3D lidar sensor, where the 3D lidar sensor is mounted in a carved-out portion of a mast of the mobile robotic device and fixed relative to the mast such that a vertical field of view of the 3D lidar sensor is angled downward toward an area in front of the mobile robotic device. The system further includes means for controlling the mobile robotic device based on the sensor data.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
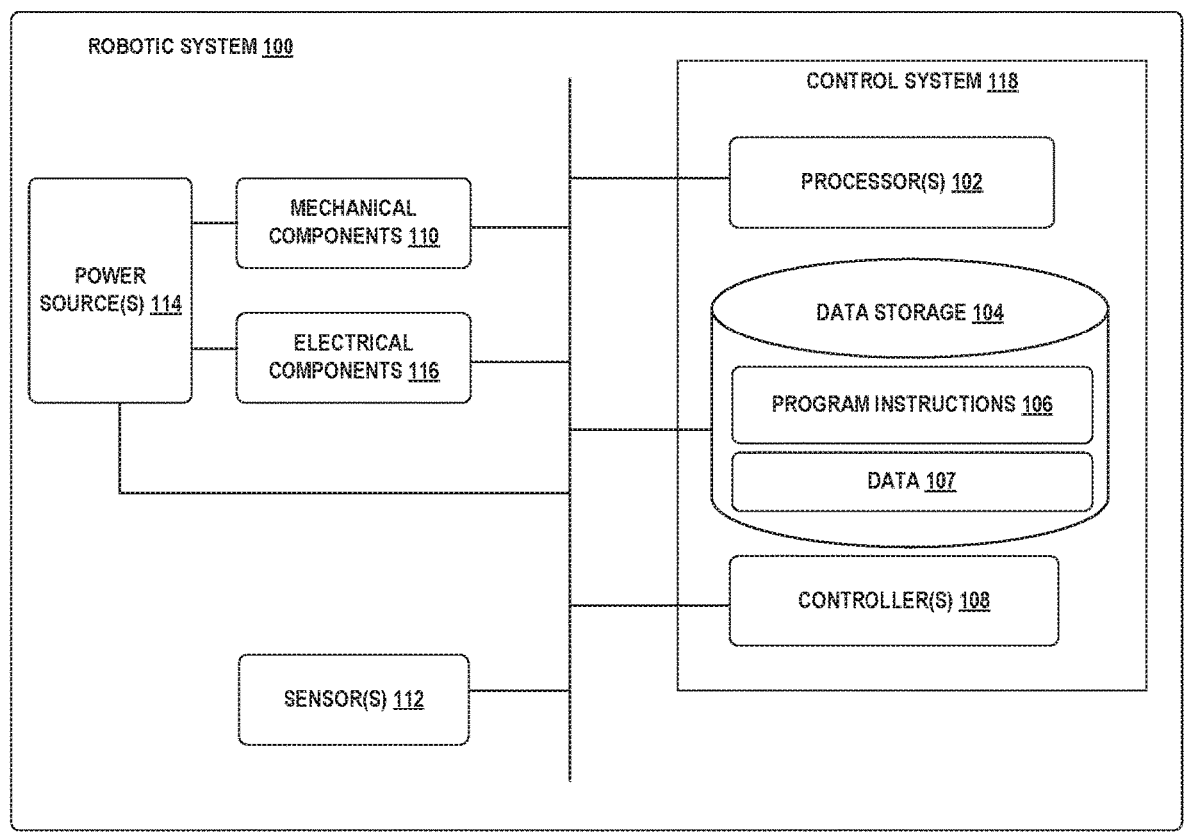
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

A mobile robotic device may use a variety of sensors to collect information about an environment to assist the robot in operating in the environment. By optimizing the selection of sensors as well as the position and orientation of selected sensors on the robot, overall cost may be reduced while allowing the robot to achieve desired sensor coverage in regions of interest. For non-industrial robots as well as certain classes of industrial robots, it may be particularly beneficial from a cost perspective to leverage an individual sensor for multiple disparate purposes.

In some examples, a robot may be equipped with a three-dimensional (3D) lidar sensor. A 3D lidar sensor measures distance to objects in the environment by illuminating the objects with laser light and measuring reflected light with one or more sensing elements. Differences in laser return times and/or wavelengths may then be used to generate 3D representations of the environment. Some 3D lidar sensors employ a rapidly spinning mirror that reflects light from a laser into the environment to generate a 3D point cloud of reflections or returns. Consequently, 3D lidar sensors may have a horizontal field of view of 360 degrees around a vertical axis of rotation, but only in one fixed angle defining a vertical field of view. In some examples, the vertical field of view may be slightly greater than 90 degrees (e.g., approximately 95 degrees). In other examples, the vertical field of view may be significantly greater than 90 degrees, equal to 90 degrees, or less than 90 degrees. In order to maximally benefit from the available field of view of a 3D lidar sensor, the 3D lidar sensor may be mounted on a robot at a carefully chosen position and orientation.

In some examples described herein, a 3D lidar sensor may be mounted in a carved-out portion of a mast of a robotic device. The mast may be fixed relative to a mobile base of the robot. The mast may be positioned between a rotatable perception housing and a rotatable arm joint as part of a stacked tower mounted near the front of the mobile base. The 3D lidar sensor may be fixed at an orientation that causes the vertical field of view of the 3D lidar sensor to angle downwards towards an area in front of the robot. In some examples, the 3D lidar may be mounted such that its vertical axis tilts forward. The position and orientation of a 3D lidar sensor may be optimized to allow the robot to leverage depth data from the 3D lidar sensor for multiple purposes, including front cliff detection, obstacle detection, and robot localization.

In regards to front cliff detection, the 3D lidar sensor may be angled so that its vertical field of view includes the ground surface directly in front of the robot (e.g., touching or with a few centimeters of a front bumper of the robot). Sensor data from the 3D lidar sensor may therefore be used to detect unexpected changes in altitude in a ground surface in front of the robot, which may indicate a cliff that should be avoided by the robot. Inclusion of points on the ground surface directly in front of the robot covers the safety case where the robot is turned on or activated while positioned directly in front of a cliff in a new environment. The vertical field of view may additionally include points on the ground surface at further distances from the robot to allow the 3D lidar sensor to detect cliffs in the distance as well. A maximum velocity for the robot may be set based on a distance at which the 3D lidar sensor can reliably detect cliffs in front of the robot. In some examples, one or more other sensors (e.g., cameras) from the robot's perception suite may provide sensor data that may be used to aid in cliff detection in addition to the 3D lidar sensor.

In regards to obstacle detection, the vertical field of view of the 3D lidar sensor may sweep up from one extreme direction that points at the ground directly in front of the robot to a second extreme direction that extends above a height parallel to the top of a perception housing of the robot (e.g., at a distance of two meters in front of the robot). More specifically, in some examples, the vertical field of view may extend from a first angle that is between 10 and 20 degrees above a horizontal vector pointing in front of the mobile robotic device to a second angle that is between 75 and 85 degrees below the horizontal vector. The 3D lidar sensor may therefore be effective for detecting obstacles in front of the robot within the height range of the robot itself.

In regards to robot localization, by angling the vertical field of view of the 3D lidar sensor downward toward an area in front of the robot, the 3D lidar sensor will also capture sensor data indicative of surfaces behind and above the robot. Moreover, the shape of the carved-out portion of the mast may prevent the mast from obstructing too much of the upper hemisphere behind the robot from the 3D lidar sensor. Depth information about the upper hemisphere of the robot's environment may be used to help determine the robot's location in the environment. The upper hemisphere may contain mostly static structures (e.g., portions of the ceiling and/or walls) which provide good reference points for robot localization. In some examples, the robot may maintain a voxel representation of occupied voxels in the environment. Localization based on sensor data from the 3D lidar sensor may then involve voxel matching between detections and the stored voxel representation.

By choosing a position and orientation for a 3D lidar sensor that optimizes coverage of certain areas around a robot, compromises may similarly be made in accepting blind spots. For instance, by angling the 3D lidar sensor downward toward an area in front of the robot, the vertical field of view of the 3D lidar sensor may only extend slightly above horizontal. As a result, the 3D lidar sensor may not be able to detect an area in front and substantially above the robot. In some examples, this compromise may be acceptable because the robot may be unlikely to encounter obstacles hovering above the robot. If, for instance, an operator is standing in front of the robot, the 3D lidar will be sufficient to detect a portion of the operator's body even if the operator is not fully in view of the 3D lidar sensor. Furthermore, in some examples, a separate sensor such as a camera located in a perception housing of the robot may provide coverage of the blind spot above the field of view of the 3D lidar sensor in front of the robot. In addition, while the upper hemisphere in front of the robot may not be detected by the 3D lidar sensor, the upper hemisphere behind the robot may be equally sufficient for robot localization.

An additional blind spot that may result from angling the vertical field of view of the 3D lidar sensor downward toward an area in front of the robot is an area behind the robot at ground level. In some examples, a compromise solution may involve using a group of one-dimensional (1D) time-of-flight (ToF) sensors positioned on a rear side of the mobile base of the robot to detect this area. While not as precise as the 3D lidar sensor, these 1D ToF sensors may provide sufficient depth data about the area behind the robot. The robot generally may require more detailed data about the area in front where the robot is more likely to operate by, for example, picking up and manipulating objects.

In other examples, an additional 3D lidar sensor may be mounted on the back side of the mast to detect obstacles behind the robot. The additional 3D lidar sensor may be mounted in a separate or the same carved-out portion of the mast as the front 3D lidar sensor. In various examples, the additional 3D lidar sensor may be tilted upwards, downwards, or fixed in a vertical orientation. In further examples, an additional 3D lidar may instead be mounted on the mobile base (e.g., near the rear end of the mobile) to detect obstacles behind the robot. In yet other examples, one or more different types of sensors may be used to detect obstacles behind the robot as well or instead.

II. EXAMPLE ROBOTIC SYSTEMS

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
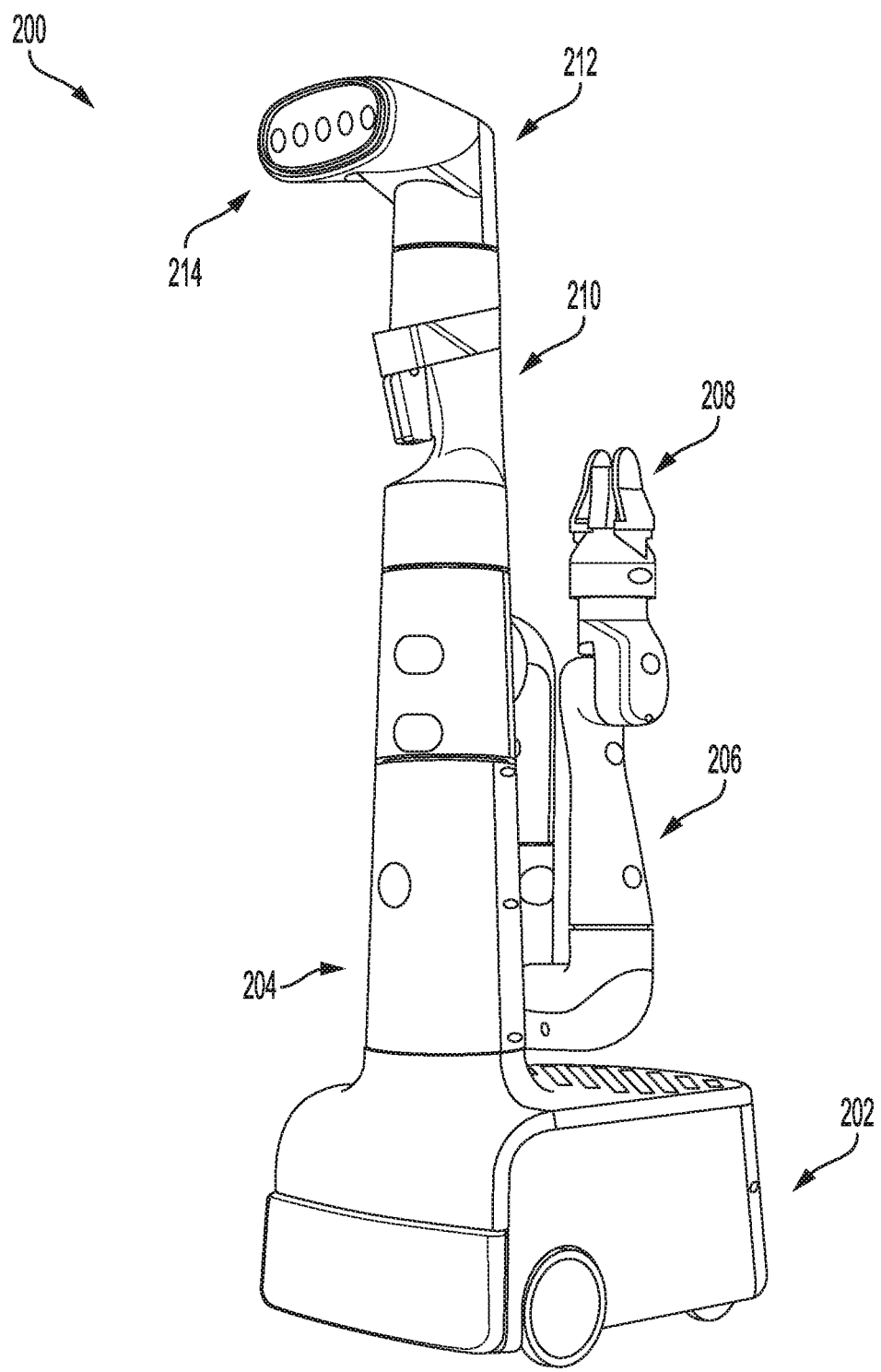
FIG. 2 illustrates a mobile robot, in accordance with example embodiments.
Figure 3:
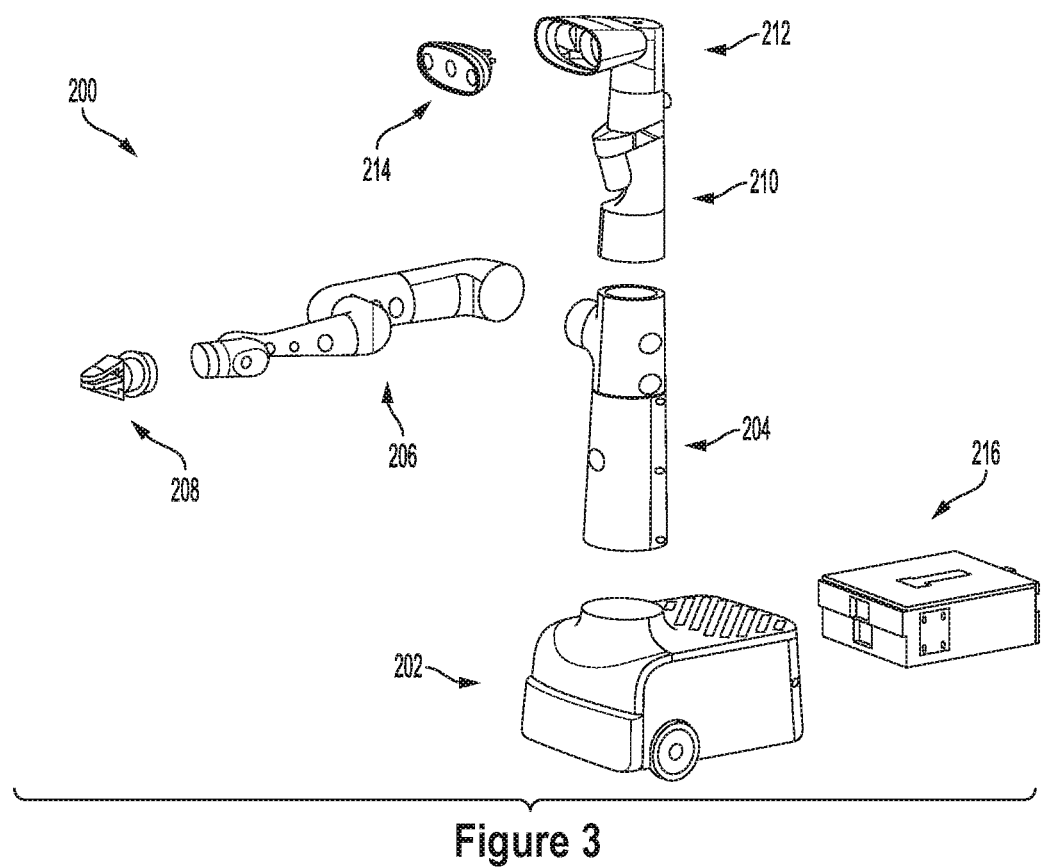
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7 DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination.

Figure 4:
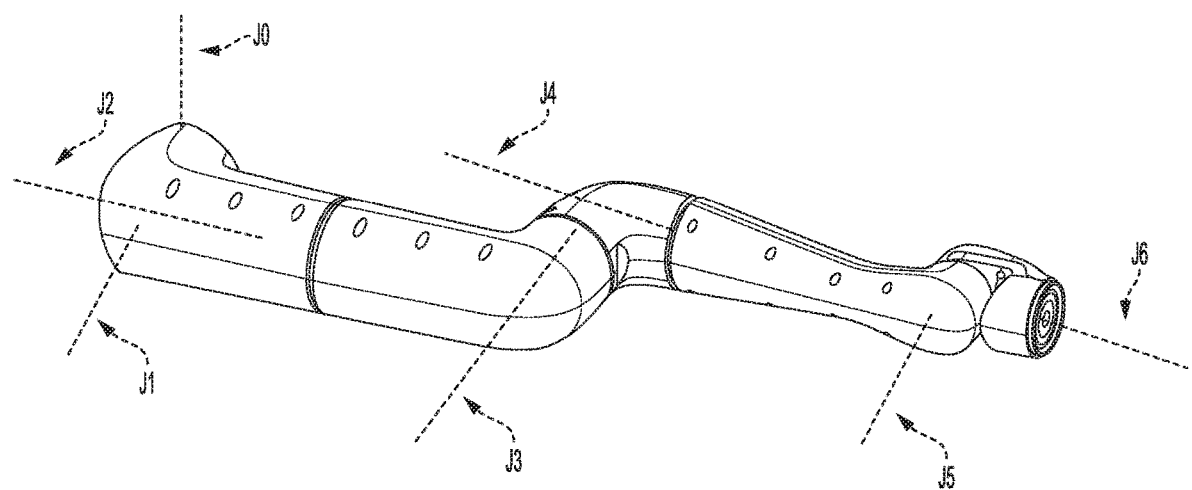
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll 36 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5A:
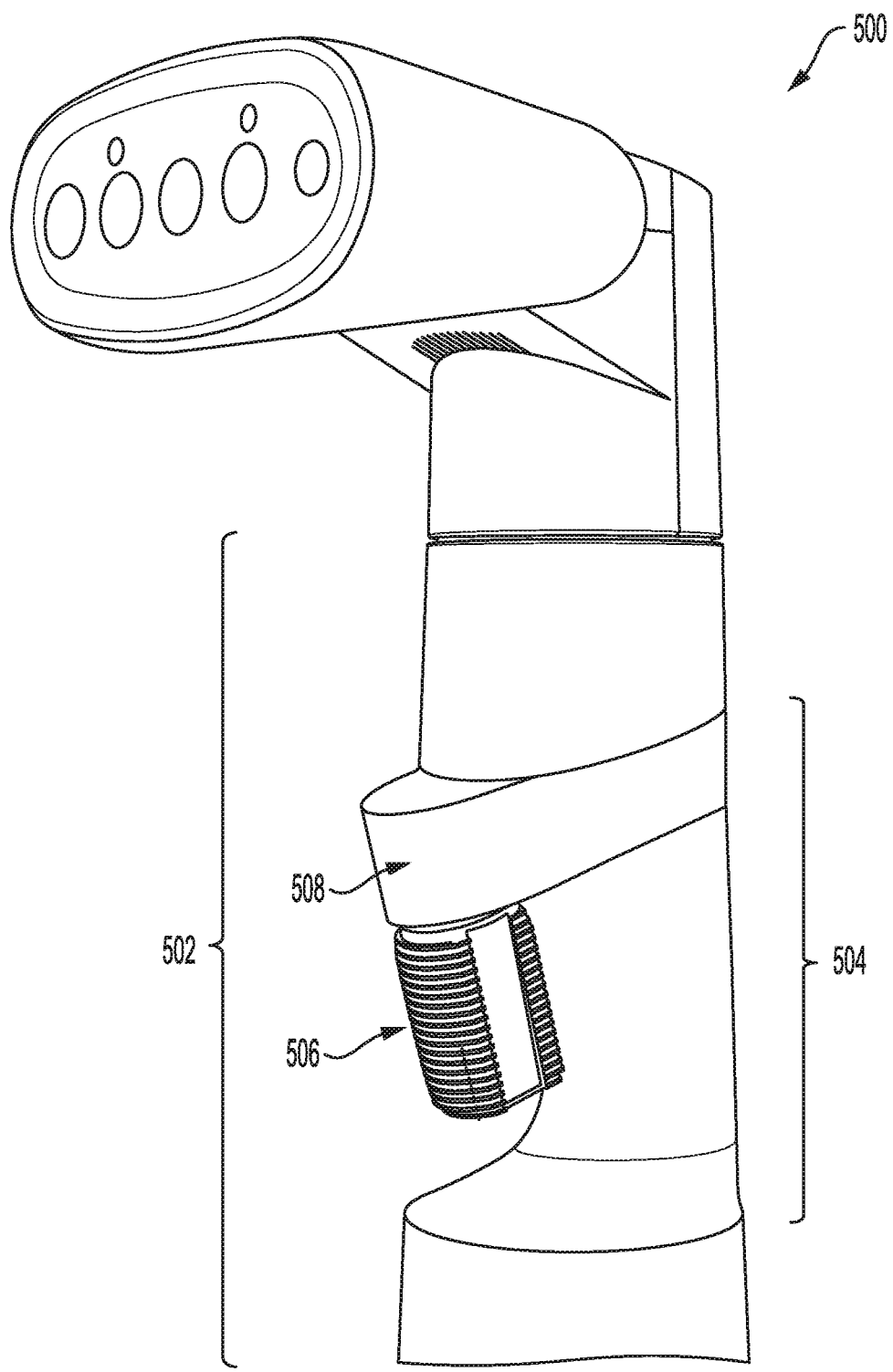
FIGS. 5A and 5B illustrate a robot mast with a 3D lidar sensor, in accordance with example embodiments.
Figure 5B:
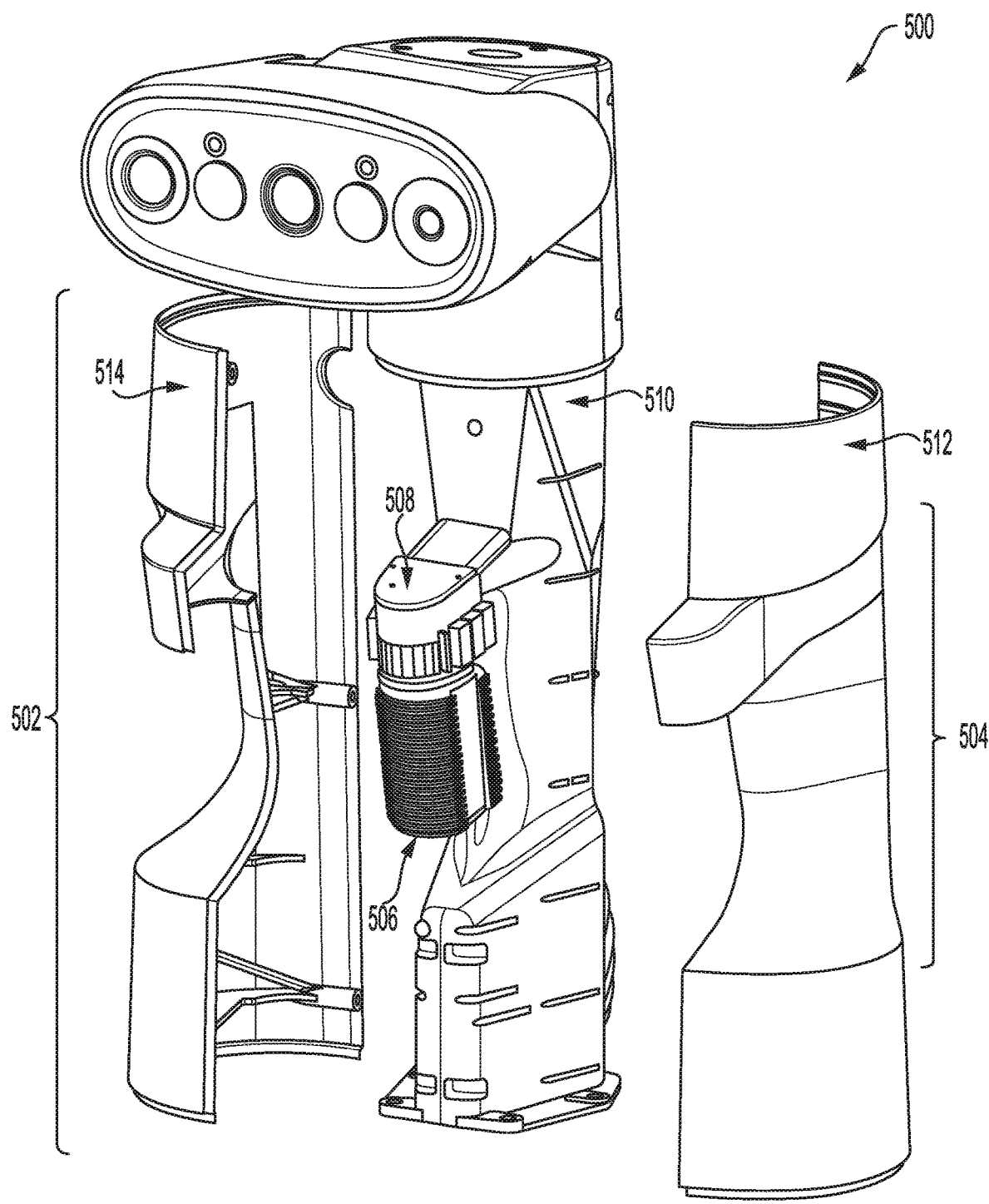

FIGS. 5A and 5B illustrate a robot mast with a 3D lidar sensor, in accordance with example embodiments. More specifically, FIG. 5A illustrates a robot 500 that may be the same or similar to the robot illustrated and described with respect to FIGS. 2 and 3. The robot 500 includes a mast 502. The mast 502 includes a carved-out portion 504. A 3D lidar sensor 506 is mounted in the carved-out portion 504 by attaching the 3D lidar sensor 506 below mounting point 508.

In some examples, the 3D lidar sensor 506 may be configured to have a 360 degree horizontal field of view at a fixed vertical angle. In some examples, the fixed vertical angle may be greater than 90 degrees. In other examples, the fixed vertical angle may be equal to or less than 90 degrees. The horizontal field of view may be defined around a vertical axis of rotation of one or more mirrors that reflect light projected by one or more lasers into the environment of the robot 500 to collect depth measurements. In reference to FIG. 5A, the vertical axis may run through the center of the 3D lidar sensor 506 and through the mounting point 508. As illustrated in FIG. 5A, the 3D lidar sensor 506 may be tilted forward. Accordingly, the vertical field of view of the 3D lidar sensor 506 may be angled downward toward an area in front of the robot 500. As an example, the vertical axis of the 3D lidar sensor 506 may be tilted forward 16 degrees from vertical toward the front of the robot.

The carved-out portion 504 may allow the 3D lidar sensor 506 to be mounted under mounting point 508 so that the 3D lidar sensor 506 is contained within the carved-out portion 504 when viewed from the top down. The carved-out portion 504 may be positioned between two substantially cylindrical portions of the mast 502. Additionally, at least a portion of the 3D lidar sensor may be contained between the substantially cylindrical portions without sticking out. Advantageously, by mounting the 3D lidar sensor 506 within carved-out portion 504, the 3D lidar sensor may be prevented from obscuring other sensors in the perception suite of the robot 500. Additionally, the carved-out portion 504 may prevent the mast 502 from obscuring an excessive amount of the horizontal field of view of the 3D lidar sensor 506. In some examples, at least 270 degrees of the horizontal field of view of the 3D lidar sensor is not obscured by the mast 502 based on the shape of the carved-out portion 504. In other examples, the mast 502 and/or the carved-out portion 504 may have different shapes or dimensions.

In reference to FIG. 5B, the mast 502 of robot 500 may include a backing component 510 to which the 3D lidar sensor 506 is mounted under mounting point 508. The backing component 510 may house wiring to connect the 3D lidar sensor 506 to the perception housing and/or midsection of the robot 500. The backing component 510 may also house other components, such as a printed circuit board. The mast 502 may additionally include two symmetric housing components 512 and 514. The two symmetric housing components 512 and 514 may attach to either side of the backing component 510 such that the 3D lidar sensor 506 is external to a volume encompassed by the backing component 510 and the two symmetric housing components 512 and 514. The backing component 510 and/or the two symmetric housing components 512 and 514 may be injection molded.

In some examples, the mast 502 illustrated in FIGS. 5A and 5B may be pan of a stacked tower positioned at a front end of a mobile base of the robot 500. Above the mast 502, the stacked tower may include a perception housing that can pan and tilt. Below the mast 502, the stacked tower may include a rotational joint of a robotic arm. The rotational joint of the robotic arm may be configured to rotate the robotic arm without rotating the mast. Accordingly, the mast may remain fixed relative to the mobile base. The stacked tower may be fixed to the mobile base so that the 3D lidar sensor 506 is oriented to detect an area near ground level in front of the mobile base. The mobile base of robot may additionally include a group of 1D ToF sensors directed toward an area near ground level behind the mobile base. Taken together, this sensor arrangement may provide an appropriate compromise for certain applications, particularly where more precise data indicative of the area in front of the robot is needed than for the area behind the robot.

Figure 6A:
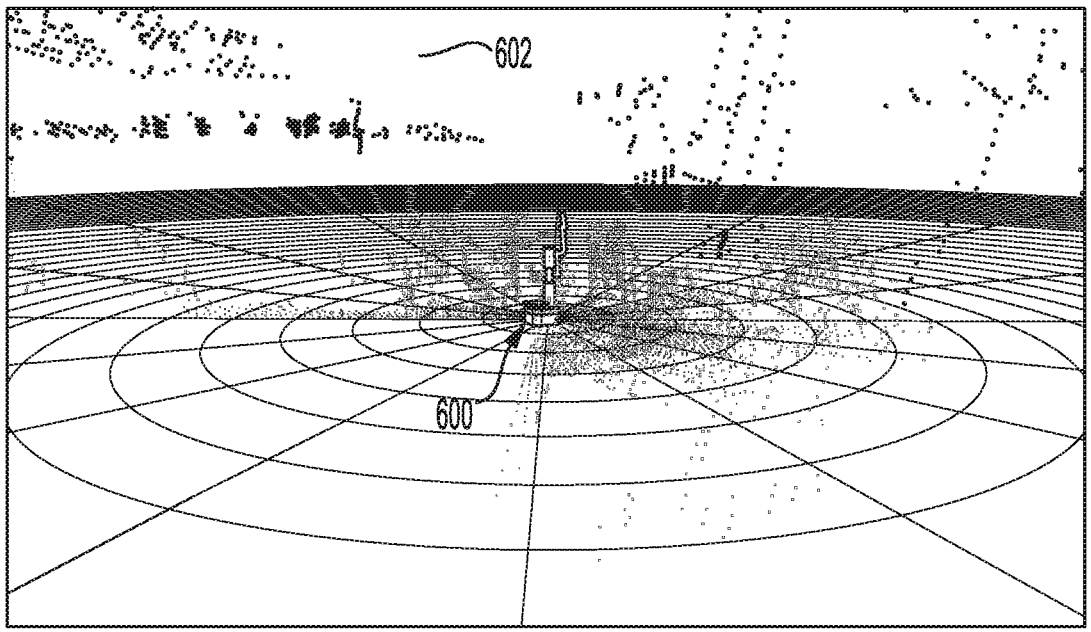
FIGS. 6A, 6B, and 6C illustrate detections by a 3D lidar sensor, in accordance with example embodiments.
Figure 6B:
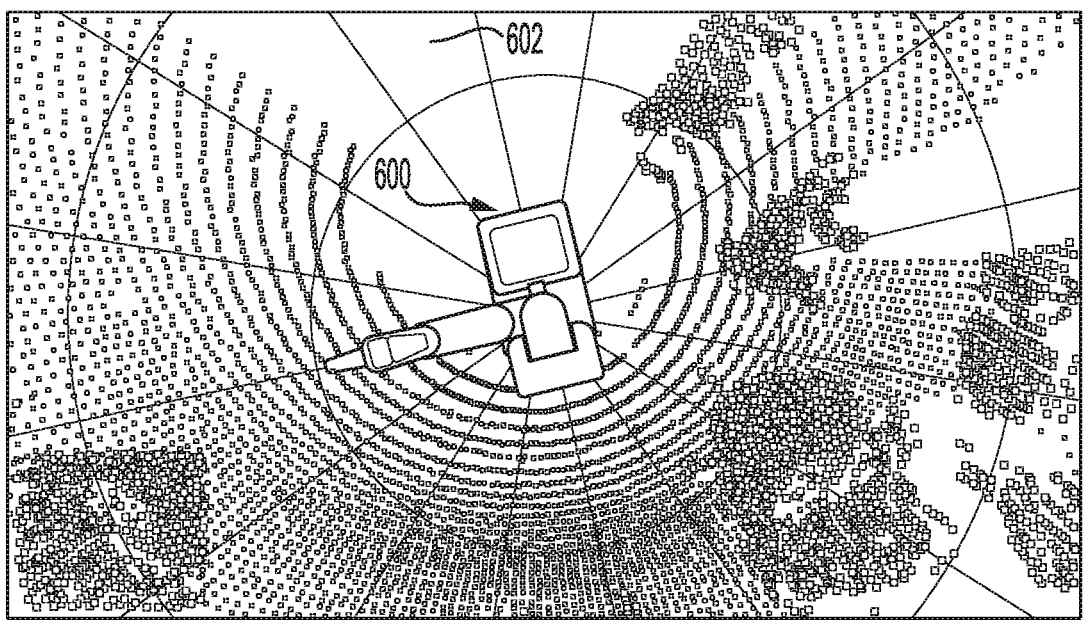
Figure 6C:
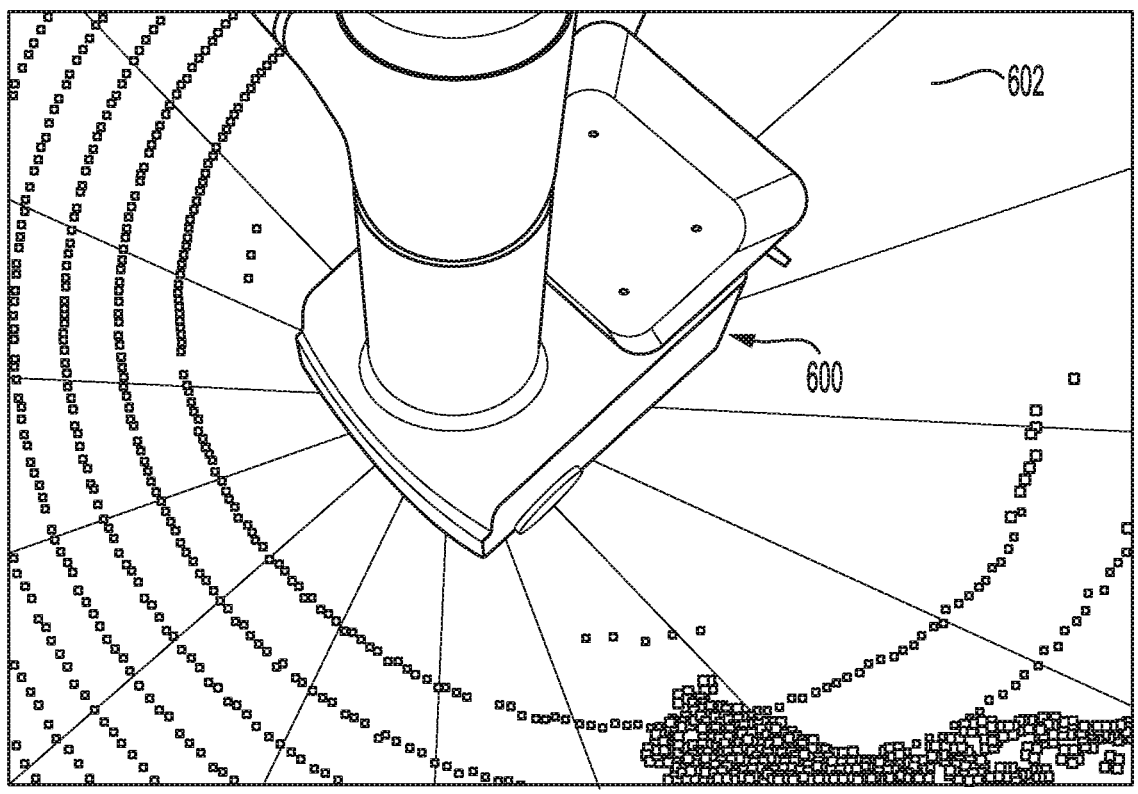

FIGS. 6A, 6B, and 6C illustrate detections by a 3D lidar sensor, in accordance with example embodiments. More specifically, FIG. 6A illustrates a zoomed-out angular view, FIG. 6B illustrates a top-down view, and FIG. 6C illustrates a zoomed-in angular view of a point cloud of detections by a 3D lidar sensor on a robot 600 in an environment 602. The robot 600 may be the same or similar as illustrated in FIGS. 2, 3, and/or 5A and 5B.

For purposes of illustration, the individual point detections are divided into three categories. The smaller unfilled squares represent point detections on a ground surface of the environment 602. The larger unfilled squares represent point detections on objects in the environment 602. The filled squares represent point detections on an upper hemisphere of the environment 602 (e.g., the ceiling and/or walls).

Regarding point detections on the ground surface, as illustrated for instance by FIG. 6B, based on the position and orientation of the 3D lidar sensor on the robot 600, the point detections are closest to the robot 600 directly in front of the robot 600. On the sides of the robot 600, the point detections are further away from the robot 600. Furthermore, the 3D lidar sensor is unable to detect the ground surface directly behind the robot 600. These tradeoffs allow for precise front cliff detection, which may be a priority assuming the mobile base of the robot 600 typically navigates in a forward direction. In some examples, the ground surface may not be detected for a minimal distance in front of the robot, as illustrated for instance by FIG. 6C. This distance may be kept small enough to prevent any risk of the mobile base of the robot 600 travelling over a cliff given the positioning of front wheels on the robot 600. There may be less need to detect cliffs behind the robot 600. Accordingly, a less costly alternative cliff detection solution such as downward-facing 1D ToF sensors may be used on the robot 600 to detect cliffs behind the robot 600.

Regarding point detections on objects, as illustrated for instance by FIG. 6B, the positioning of the 3D lidar sensor may allow the robot 600 to detect at least some portion of obstacles located in front and to the sides of the robot 600. As illustrated for instance by FIG. 6A, the vertical field of view of the 3D lidar sensor may only allow the robot 600 to detect points on obstacles up to a height approximately parallel to a perception housing of the robot 600. This tradeoff may be acceptable because most objects are unlikely to float above the robot without also having portions closer to ground level that will be detected by the 3D lidar sensor on robot 600. Furthermore, one or more other sensors (e.g., cameras) in the perception suite of the robot may also provide coverage of this area. In addition, there may be less need to detect floating objects that are outside a safety critical path that the robot may traverse. Similarly, detecting objects behind the robot 600 may also be less critical. Accordingly, a less costly alternative object detection solution such as horizontally arranged 1D ToF sensors along the rear side of the robot 600 may be used to detect obstacles behind the robot 600.

Regarding point detections on the upper hemisphere, as illustrated for instance by FIG. 6A, points on the ceilings and/or walls behind and to the sides of the robot 600 may be detected by the 3D lidar sensor. This sensor data may be used to help localize the robot 600 in environment 602. For example, the localization process may involve aligning detected points with a voxel grid representation of surfaces in the environment 602. These surfaces in the upper hemisphere may be particularly appropriate for robot localization because the surfaces are largely static and unlikely to change often over time. Additionally, portions of the upper hemisphere behind and to the sides of the robot 600 may be equally effective as points of the upper hemisphere in front of the robot 600 which may not be detected based on the position and orientation of the 3D lidar sensor on the robot 600.

It should be understood that the point clouds represented in FIGS. 6A, 6B, and 6C are for purposes of illustration. In practice, the robot 600 may include additional sensors that provide additional point cloud data or other types of sensor data. Additionally, in alternative examples, different arrangements of a 3D lidar sensor on a robot may produce different point cloud representations of an environment.

Figure 7:
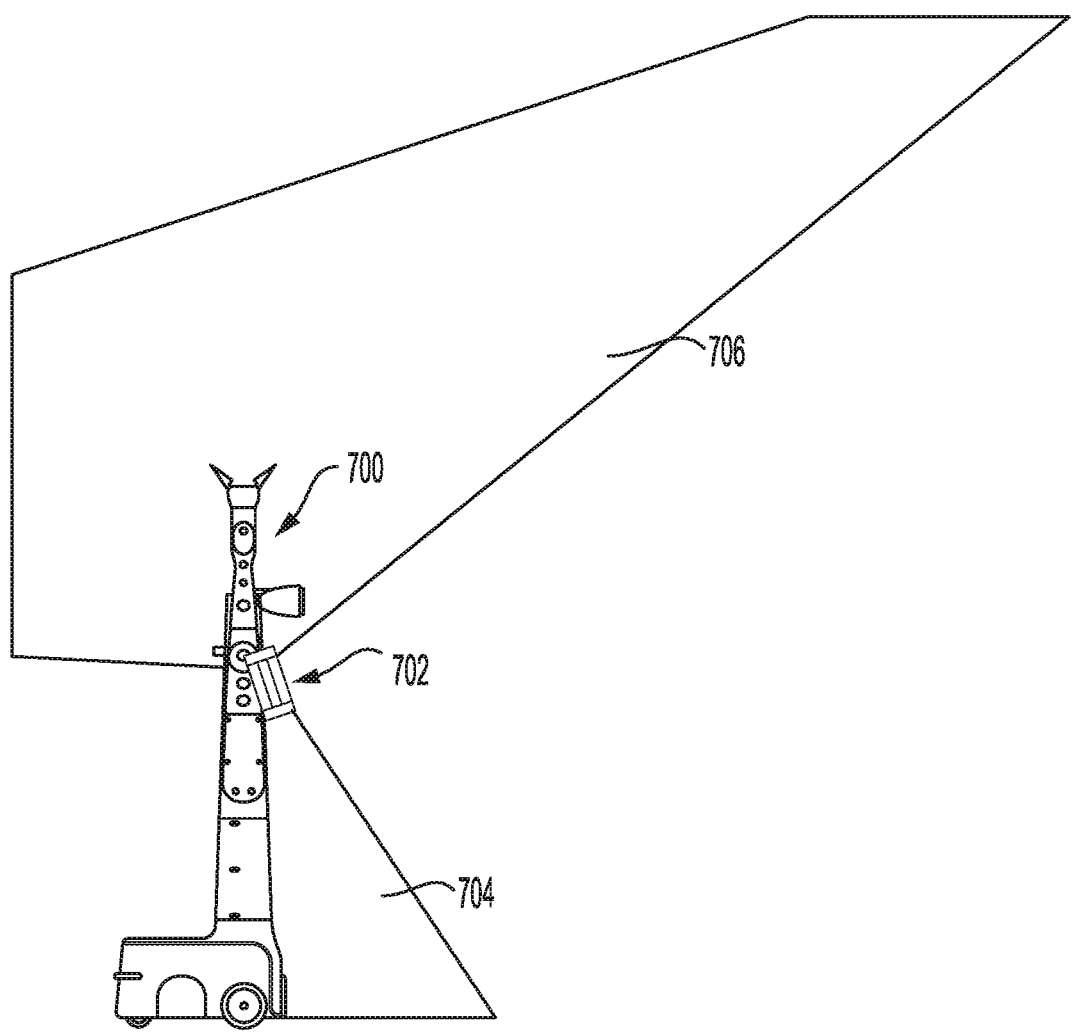
FIGS. 7, 8, and 9 illustrate fields of view of a 3D lidar sensor in different mounting orientations, in accordance with example embodiments.
Figure 8:
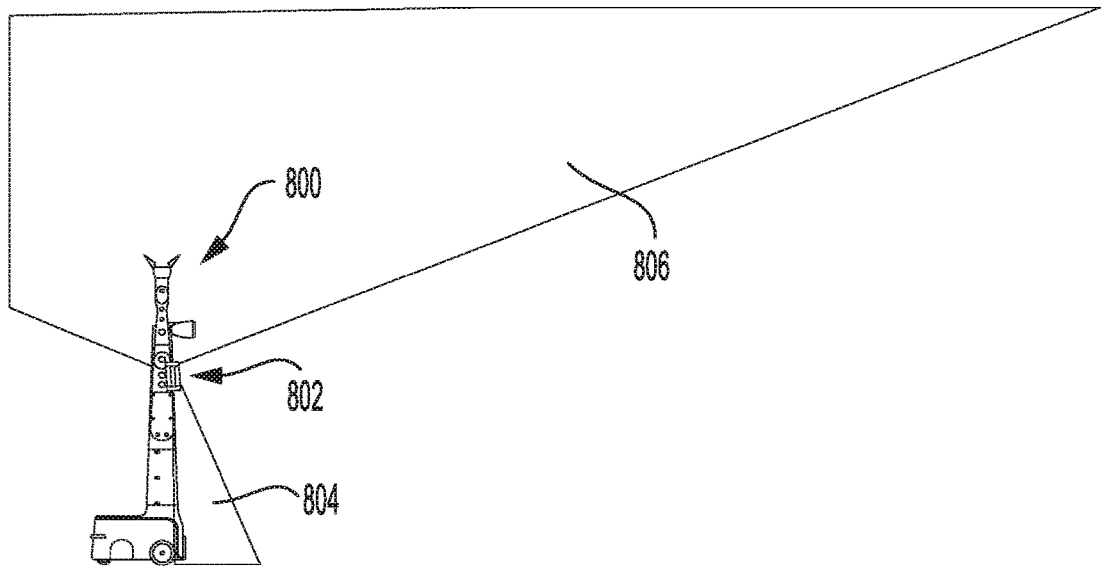
Figure 9:
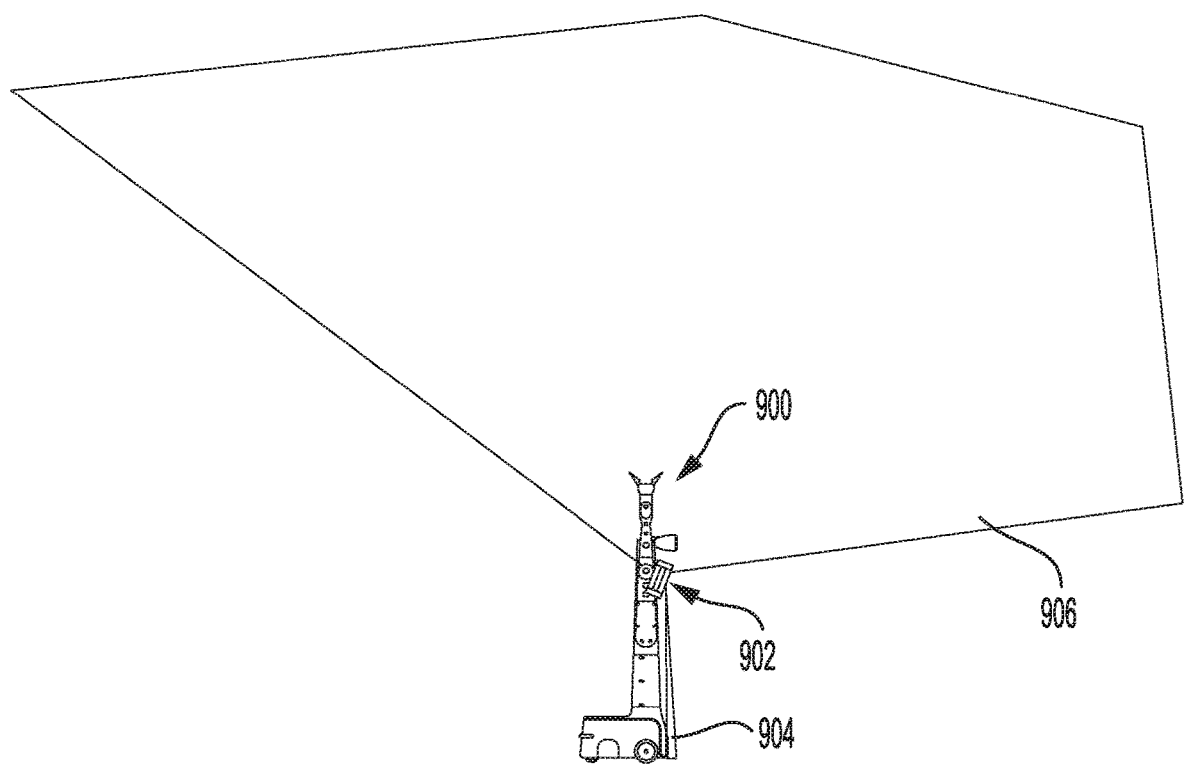

FIGS. 7, 8, and 9 illustrate fields of view of a 3D lidar sensor in different mounting orientations, in accordance with example embodiments. More specifically, FIGS. 7, 8, and 9 each represent two respective blind spots resulting from a different mounting angle of a 3D lidar sensor on a robotic device. For each figure, the vertical field of view of the 3D lidar sensor covers the area between the two blind spots in a direction directly in front of the robot. For purposes of illustration, the vertical field of view of the 3D lidar sensor is represented as being slightly greater than 90 degrees in each figure. In alternative examples, a 3D lidar sensor with a different vertical field of view may be used instead.

FIG. 7 represents a first mounting position of a 3D lidar sensor on a robotic device in which the 3D lidar sensor is angled upwards towards the front of the robot. More specifically, robot 700 may include 3D lidar sensor 702 with a vertical axis tilted backwards from vertical (e.g., by an angle of 18 degrees). A first blind spot 704 in front of robot 700 may result from this mounting angle of 3D lidar sensor 702. Additionally, a second blind spot 706 above and behind the robot 700 may also result from this mounting angle of 3D lidar sensor 702.

In some applications, the blind spot 704 may not allow the 3D lidar sensor 702 to be used for front cliff detection because too large an area of the ground surface in front of robot 700 is not detectable by the 3D lidar sensor 702. At the mounting angle illustrated in FIG. 7, the 3D lidar sensor 702 may be effective for detecting an area in front and substantially above the robot 700. Additionally, this mounting angle may be effective for robot localization using a portion of the upper hemisphere in front of the robot 700 based on the position of the blind spot 706. In some applications, the mounting angle illustrated in FIG. 7 may be a preferred mounting angle. However, it may not be critical for the 3D lidar sensor 702 to detect the area in front and substantially above the robot 700 in some applications.

FIG. 8 represents a second mounting orientation of a 3D lidar sensor on a robotic device in which the 3D lidar sensor is vertical. More specifically, robot 800 may include 3D lidar sensor 802 with a vertical axis that is perpendicular to the ground. A first blind spot 804 in front of robot 800 may result from this mounting angle of 3D lidar sensor 802. Additionally, a second blind spot 806 above the robot 800 may also result from this mounting angle of 3D lidar sensor 802. Although the 3D lidar sensor 802 is mounted vertically on robot 800, the vertical field of view of the 3D lidar sensor 802 may be angled down toward an area in front of the robot based on the internal configuration of the 3D lidar sensor 802.

In some applications, the mounting angle of the 3D lidar sensor 802 illustrated in FIG. 8 may be the preferred mounting angle. However, although smaller than blind spot 704, the blind spot 804 may not allow the 3D lidar sensor 802 to be used for front cliff detection because too large an area of the ground surface in front of robot 800 is still not detectable by the 3D lidar sensor 802. In addition, the blind spot 806 may not allow the 3D lidar sensor 802 to be used effectively for robot localization because not enough of the upper hemisphere of the environment is detected by the 3D lidar sensor 802. At the mounting angle illustrated in FIG. 8, less of the upper hemisphere may be detected by 3D lidar sensor 802 than by 3D lidar sensor 702 in FIG. 7.

FIG. 9 represents a third mounting orientation of a 3D lidar sensor on a robotic device in which the 3D lidar sensor is angled downwards towards the front of the robot. More specifically, robot 900 may include 3D lidar sensor 902 with a vertical axis tilted forward from vertical (e.g., by an angle of 16 degrees). A first blind spot 904 in front of robot 900 may result from this mounting angle of 3D lidar sensor 902. Additionally, a second blind spot 906 above and in front of the robot 900 may also result from this mounting angle of 3D lidar sensor 902.

The blind spot 904 may be sufficiently small (or in some cases, non-existent) to allow the 3D lidar sensor 902 to be used effectively for front cliff detection. In addition, the blind spot 906 may not prevent the 3D lidar sensor 902 from being used effectively for robot localization because enough of the upper hemisphere of the environment behind and above the robot 900 is detected by the 3D lidar sensor 902. At the mounting angle illustrated in FIG. 9, the upper extreme vector of the vertical field of view of the 3D lidar sensor 902 may angle slightly upwards from horizontal. For instance, the vector may cross a height parallel to the top of the robot's perception housing at a distance of two meters from the robot. In some examples, this vertical field of view may also provide sufficient coverage for obstacle detection in front of the robot 900, in addition to front cliff detection and robot localization. Accordingly, the mounting angle of the 3D lidar sensor 902 illustrated in FIG. 9 may be the preferred mounting angle in some applications.

Figure 10:
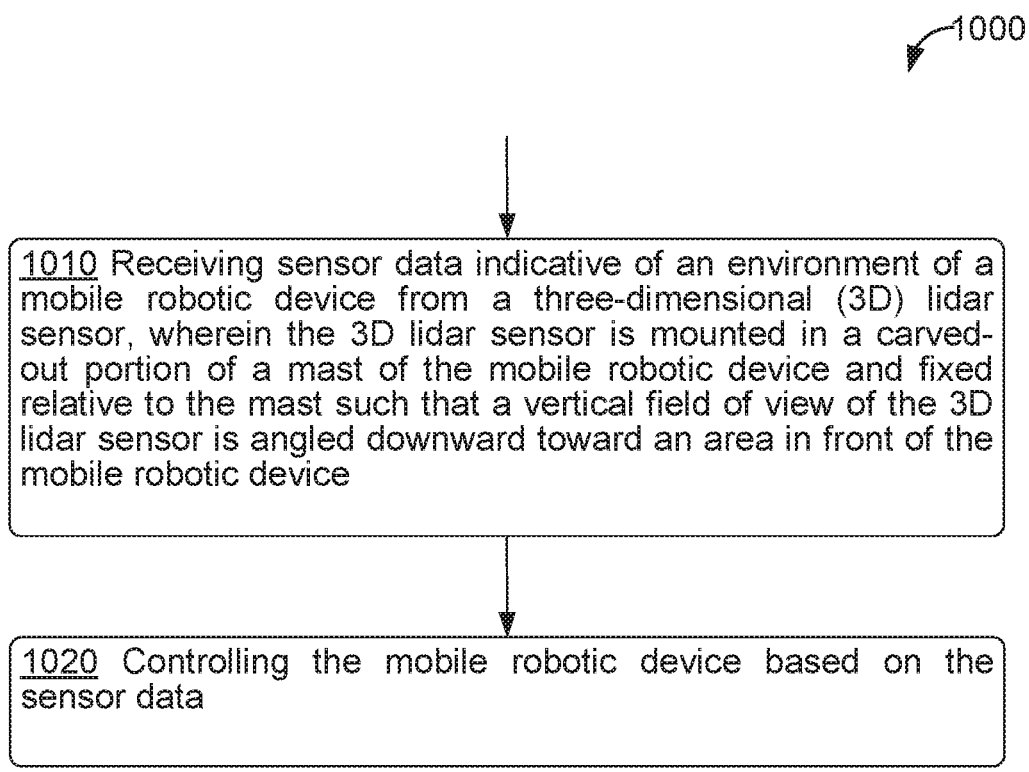
FIG. 10 is a block diagram of a method, in accordance with example embodiments.

FIG. 10 is a block diagram of a method, in accordance with example embodiments. In some examples, method 1000 of FIG. 10 may be carried out by a control system, such as control system 118 of robotic system 100. In further examples, method 1000 may be carried by one or more processors, such as processor(s) 102, executing program instructions, such as program instructions 106, stored in a data storage, such as data storage 104. Execution of method 1000 may involve any of the robots and/or robot components illustrated and described with respect to FIGS. 1-4, 5A-5B, 6A-6C, 7-9, and/or 10. Other robotic devices may also be used in the performance of method 1000. In further examples, some or all of the blocks of method 1000 may be performed by a control system remote from the robotic device. In yet further examples, different blocks of method 1000 may be performed by different control systems, located on and/or remote from a robotic device.

At block 1010, method 1000 includes receiving sensor data indicative of an environment of a mobile robotic device from a 3D lidar sensor. The 3D lidar sensor may be mounted in a carved-out portion of a mast of the mobile robotic device. The 3D lidar sensor may be fixed relative to the mast such that a vertical field of view of the 3D lidar sensor is angled downward toward and area in front of the robot. In some examples, a vertical axis of the 3D lidar sensor may be tilted forward relative to vertical toward the front of the robot. The sensor data may be point cloud data.

In some examples, the 3D lidar sensor is angled such that the vertical field of view of the 3D lidar sensor includes a ground surface directly in front of the mobile robotic device. For instance, the vertical field of view of the 3D lidar sensor may include a portion of or directly align with a front bumper of a mobile base of the robotic device.

In some examples, the vertical field of view of the 3D lidar sensor is greater than ninety degrees, and the 3D lidar sensor is angled such that an upper bound of the vertical field of view of the 3D lidar sensor extends from the 3D lidar sensor at an angle above a horizontal vector pointing in front of the mobile robotic device.

In some examples, the vertical field of view of the 3D lidar sensor extends from a first angle that is between 10 and 20 degrees above a horizontal vector pointing in front of the mobile robotic device to a second angle that is between 75 and 85 degrees below the horizontal vector.

At block 1020, the method 1000 further includes controlling the mobile robotic device based on the sensor data. Controlling the mobile robotic device may involve using the sensor data from the 3D lidar sensor for any combination of front cliff detection, obstacle detection, and robot localization.

More specifically, the sensor data may be indicative of a ground surface directly in front of a mobile base of the mobile robotic device, and the method 1000 may further involve detecting a cliff in front of the mobile robotic device. Controlling the mobile robotic device may then involve navigating the mobile base of the mobile robotic device based on the detected cliff. For instance, the mobile robotic device may be controlled to stop or change direction to avoid going over the detected cliff.

The sensor data from the 3D lidar sensor may also be indicative of one or more obstacles in front or to the side of the mobile robotic device. In that case, controlling the mobile robotic device based on the sensor data may involve avoiding contact with the one or more obstacles. For instance, the mobile robotic device may be controlled to stop or change direction to avoid hitting a detected obstacle.

The sensor data from the 3D lidar sensor may also be indicative of one or more surfaces above and behind the mobile robotic device, and the method 1000 may further involve determining a location of the mobile robotic device relative to the one or more surfaces. Determining the location of the mobile robotic device may involve aligning the sensor data with a voxel grid representation of an environment of the mobile robotic device. The mobile robotic device may then be controlled based on the determined location of the mobile robotic device relative to the one or more surfaces.

Examples described herein involve optimizing the position and orientation of a 3D lidar sensor on a mobile robotic device to leverage sensor data from the 3D lidar sensor for front cliff detection, obstacle detection, and robot localization. The sensor data may be used for other purposes as well. Furthermore, the position and orientation of the 3D lidar sensor may be adjusted to optimize the sensor data collected for different applications.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A mobile robotic device, comprising:
a mobile base;
a mast fixed relative to the mobile base, wherein the mast includes a carved-out portion; and
a three-dimensional (3D) lidar sensor mounted in the carved-out portion of the mast and fixed relative to the mast such that a vertical field of view of the 3D lidar sensor is angled downward toward an area in front of the mobile robotic device, wherein the shape of the carved-out portion of the mast and the position and orientation of the 3D lidar sensor enables the 3D lidar sensor to capture sensor data indicative of one or more surfaces above and behind the mobile robotic device.

2. The mobile robotic device of claim 1, wherein the 3D lidar sensor is angled such that the vertical field of view of the 3D lidar sensor includes a ground surface directly in front of the mobile robotic device.

3. The mobile robotic device of claim 1, wherein the vertical field of view of the 3D lidar sensor is greater than ninety degrees, and wherein 3D lidar sensor is angled such that an upper bound of the vertical field of view of the 3D lidar sensor extends from the 3D lidar sensor at an angle above a horizontal vector pointing in front of the mobile robotic device.

4. The mobile robotic device of claim 1, wherein the 3D lidar sensor is mounted such that a vertical axis of the 3D lidar sensor is tilted forward relative to vertical.

5. The mobile robotic device of claim 1, wherein the vertical field of view of the 3D lidar sensor extends from a first angle that is between 10 and 20 degrees above a horizontal vector pointing in front of the mobile robotic device to a second angle that is between 75 and 85 degrees below the horizontal vector.

6. The mobile robotic device of claim 1, further comprising a control system configured to detect a cliff in front of the mobile base of the mobile robotic device based on sensor data from the 3D lidar sensor.

7. The mobile robotic device of claim 1, further comprising a control system configured to detect one or more obstacles in front or to a side of the mobile robotic device based on sensor data from the 3D lidar sensor.

8. The mobile robotic device of claim 1, further comprising a control system configured to determine a location of the mobile robotic device based on the sensor data indicative of one or more surfaces above and behind the mobile robotic device.

9. The mobile robotic device of claim 8, wherein the control system is configured to determine the location of the mobile robotic device by aligning the sensor data with a voxel grid representation of an environment of the mobile robotic device.

10. The mobile robotic device of claim 1, wherein the 3D lidar sensor is configured to have a 360 degree horizontal field of view, and wherein at least 270 degrees of the horizontal field of view of the 3D lidar sensor is not obscured by the mast based on a shape of the carved-out portion of the mast.

11. The mobile robotic device of claim 1, wherein the mast comprises an overhanging mounting point for the 3D lidar sensor, wherein the 3D lidar sensor is mounted underneath the overhanging mounting point to fit within the carved-out portion of the mast.

12. The mobile robotic device of claim 1, wherein the mast comprises:
a backing component to which the 3D lidar sensor is mounted; and
two symmetric housing components that attach to either side of the backing component such that the 3D lidar sensor is external to a volume encompassed by the backing component and the two symmetric housing components.

13. The mobile robotic device of claim 1, wherein the mast is part of a stacked tower positioned at a front end of the mobile robotic device.

14. The mobile robotic device of claim 13, wherein the stacked tower includes a rotational joint of a robotic arm below the mast, wherein the rotational joint is configured to rotate the robotic arm without rotating the mast.

15. The mobile robotic device of claim 1, wherein the mobile base includes a plurality of one degree of freedom (1 DOF) sensors directed toward an area behind the mobile robotic device.

16. A method comprising:
receiving sensor data indicative of an environment of a mobile robotic device from a three-dimensional (3D) lidar sensor, wherein the 3D lidar sensor is mounted in a carved-out portion of a mast of the mobile robotic device and fixed relative to the mast such that a vertical field of view of the 3D lidar sensor is angled downward toward an area in front of the mobile robotic device, wherein the shape of the carved-out portion of the mast and the position and orientation of the 3D lidar sensor enables the 3D lidar sensor to capture sensor data indicative of one or more surfaces above and behind the mobile robotic device; and
controlling the mobile robotic device based on the sensor data.

17. The method of claim 16, wherein the sensor data is indicative of a ground surface directly in front of a mobile base of the mobile robotic device, wherein the method further comprises:
detecting a cliff in front of the mobile robotic device, wherein controlling the mobile robotic device comprises navigating the mobile base of the mobile robotic device based on the detected cliff.

18. The method of claim 16, wherein the sensor data is indicative of one or more obstacles in front or to a side of the mobile robotic device, wherein controlling the mobile robotic device comprises avoiding contact with the one or more obstacles.

19. The method of claim 16, wherein the method further comprises:
determining a location of the mobile robotic device relative to the one or more surfaces above and behind the mobile robotic device, wherein controlling the mobile robotic device is performed based on the determined location of the mobile robotic device relative to the one or more surfaces.

20. A mast for a mobile robotic device, comprising:
a carved-out portion; and
a three-dimensional (3D) lidar sensor mounted in the carved-out portion of the mast and fixed relative to the mast such that a vertical field of view of the 3D lidar sensor is angled downward in a direction extending outward from the carved-out portion of the mast, wherein the shape of the carved-out portion of the mast and the position and orientation of the 3D lidar sensor enables the 3D lidar sensor to capture sensor data indicative of one or more surfaces above and behind the mobile robotic device.

* * * * *